(12) United States Patent
Li et al.

(10) Patent No.: US 10,240,644 B2
(45) Date of Patent: Mar. 26, 2019

(54) FLUID DRIVING DEVICE, MOTOR ASSEMBLY AND FRICTION CLUTCH THEREOF

(71) Applicant: JOHNSON ELECTRIC INTERNATIONAL AG, Murten (CH)

(72) Inventors: Yue Li, Hong Kong (CN); Li Sheng Liu, Shenzhen (CN); Yong Wang, Shenzhen (CN); Ya Ming Zhang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/361,798

(22) Filed: Nov. 28, 2016

(65) Prior Publication Data
US 2017/0152896 A1   Jun. 1, 2017

(30) Foreign Application Priority Data

Nov. 27, 2015 (CN) .......................... 2015 1 0883306

(51) Int. Cl.
| | |
|---|---|
| *F16D 13/40* | (2006.01) |
| *F16D 13/04* | (2006.01) |
| *F16D 43/02* | (2006.01) |
| *F16D 23/12* | (2006.01) |

(52) U.S. Cl.
CPC ............. *F16D 13/40* (2013.01); *F16D 13/04* (2013.01); *F16D 43/02* (2013.01); *F16D 2023/123* (2013.01)

(58) Field of Classification Search
CPC ...................................................... F16D 13/40

USPC .................................. 192/66.3, 66.32, 54.51
See application file for complete search history.

(56) References Cited

U.S. PATENT DOCUMENTS

| | | | | | |
|---|---|---|---|---|---|
| 3,273,681 | A | * | 9/1966 | Seifert | .................... F16D 13/04 123/41.12 |
| 3,918,559 | A | * | 11/1975 | Rousset | .................... B60T 7/12 188/106 R |
| 4,926,986 | A | * | 5/1990 | Noel | ....................... F16D 43/14 477/14 |
| 2012/0018269 | A1 | * | 1/2012 | Yang | ....................... F16D 13/04 192/31 |
| 2013/0199885 | A1 | * | 8/2013 | Quehenberger | ........ F16D 13/04 192/84.1 |
| 2014/0158489 | A1 | * | 6/2014 | Yang | ...................... F16D 43/12 192/54.51 |

(Continued)

*Primary Examiner* — Timothy Hannon
(74) *Attorney, Agent, or Firm* — Muncy, Geissler, Olds & Lowe, P.C.

(57) ABSTRACT

A fluid driving device, a motor assembly and a friction clutch thereof are disclosed. The friction clutch includes: a fixing member fixed on a rotary shaft; a connecting member slidable disposed on the rotary shaft, wherein when the rotary shaft starts rotating, an axial distance between the connecting member and the fixing member changes such that a friction force between the fixing member and the connecting member increases until the connecting member rotates synchronously with the fixing member; a loading member slidable disposed on the rotary shaft, the loading member and the connecting member being circumferentially positioned; and a restoring member configured to reduce an amount of change of the axial distance between the fixing member and the connecting member when the rotary shaft stops rotating.

17 Claims, 5 Drawing Sheets

(56) References Cited

U.S. PATENT DOCUMENTS

2014/0299437 A1* 10/2014 Seillier ................. F02N 15/025
  192/66.32
2017/0058972 A1* 3/2017 Li ........................... F16D 43/18
2017/0063195 A1* 3/2017 Li ........................... H02K 7/112

* cited by examiner

FLUID DRIVING DEVICE, MOTOR ASSEMBLY AND FRICTION CLUTCH THEREOF

CROSS REFERENCE TO RELATED APPLICATIONS

This non-provisional patent application claims priority under 35 U.S.C. § 119(a) from Patent Application No. 201510883306.0 filed in The People's Republic of China on 27 Nov. 2016.

FIELD OF THE INVENTION

This invention relates to the field of fluid driving devices, and in particular to a friction clutch, a motor assembly using the friction clutch, and a fluid driving device using the motor assembly.

BACKGROUND OF THE INVENTION

In a fluid driving device such as a blower or pump, a motor connects with an impeller to drive the impeller to rotate during operation. At startup of a motor with small and greatly-fluctuating startup torque, such as a single phase synchronous motor or single phase direct current brushless motor, because the impeller has a large rotational inertia and startup load torque, vibrations may easily occur during startup of the motor; or even worse, the motor startup may failure.

In a typical method of starting the single phase motor under load, a friction startup device is used to allow the motor to rotate firstly, which in turn drives the impeller to rotate progressively. Currently, the friction startup device consists of multiple arcuate plates and an annular spring. Multiple arcuate plates are disposed on the impeller and are located on a same imaginary circle. The annular spring surrounds outer sides of the multiple arcuate plates. An end portion of a rotary shaft of the motor extends into a hole cooperatively defined by the multiple arcuate plates. As the rotary shaft of the motor rotates, the annular spring applies a constraint force to the multiple arcuate plates so that a friction force is generated between the arcuate plates and the rotary shaft. However, the friction force generated in this construction changes little with the change of the rotational speed, which is disadvantageous in reducing the rotational inertia and the startup load torque during initial period of the startup, and hence cannot effectively address vibrations and startup failure during the motor startup.

Therefore, it is urgently desired to reduce the rotational inertia and startup load torque applied to the rotary shaft during the motor startup to avoid vibrations and startup failure.

SUMMARY OF THE INVENTION

Thus, there is a desire for a friction clutch for reducing the rotational inertia and startup load applied to the rotary shaft at startup of the motor to avoid vibrations and startup failure. There is also a desire for a motor assembly and a fluid driving device employing the above friction clutch.

In one aspect, a friction clutch is introduced which includes: a fixing member fixed on a rotary shaft; a connecting member slidable disposed on the rotary shaft, wherein when the rotary shaft starts rotating, an axial distance between the connecting member and the fixing member changes such that a friction force between the fixing member and the connecting member increases until the connecting member rotates synchronously with the fixing member; a loading member slidable disposed on the rotary shaft, the loading member and the connecting member being circumferentially positioned; and a restoring member configured to reduce an amount of change of the axial distance between the fixing member and the connecting member when the rotary shaft stops rotating.

Preferably, the fixing member and the connecting member are connected through thread engagement.

Preferably, the restoring member is a resilient member.

Preferably, the loading member includes a first positioning plate in contact with the resilient member, and a load connecting portion for connecting with a load.

Preferably, the first positioning plate and the load connecting portion are integrally formed.

Preferably, the connecting member includes a second positioning plate in contact with the restoring member, and a first thread connecting member for threadingly engaging with the fixing member.

Preferably, the second positioning plate and the first thread connecting portion are integrally formed.

Preferably, the fixing member includes a positioning stop plate for positioning and contacting an end face of the connecting member, and a second thread connecting portion for threadingly engaging with the connecting member.

Preferably, the positioning stop plate and the second thread connecting portion are integrally formed.

Preferably, threads on the second threading connecting portion are male threads.

Preferably, the restoring member includes a through hole for allowing the rotary shaft to pass through.

Preferably, the restoring member is an annular corrugated sheet, a claw-shaped spring sheet, or a ring of resilient material.

Preferably, the friction clutch further comprises a plurality of sliding posts, one of the connecting member and the loading member is fixedly connected with the sliding posts, and the other is slidable engaged with the sliding posts.

Preferably, the sliding posts are symmetrically arranged with respect to an axis of rotation.

In another aspect, a motor assembly is introduced which includes a motor and a friction clutch. The friction clutch is any one of the above-described friction clutches.

Preferably, the motor assembly further comprises a position-limiting member disposed on the rotary shaft of the motor to limit axial movement of the load part, and the position-limiting member is disposed at one side of the friction clutch opposite from the motor.

Preferably, the motor assembly further comprises a position-limiting member disposed on the rotary shaft of the motor to limit axial movement of the loading member, and the position-limiting member is disposed at one side of the friction clutch opposite from the motor.

In still another aspect, a fluid driving device is introduced which includes a load part and a motor assembly. The motor assembly is any one of the above-described motor assemblies.

In view of the forgoing, in the present invention, at startup of the motor, the axial distance between the fixing member and the connecting member is changed by rotation of the rotary shaft, such that the friction force between the fixing member and the connecting member increases until the connecting member rotates synchronously with the fixing member. In the friction clutch of the present invention, at startup of the motor, the fixing member and the loading member slide relative to each other, which reduces the rotational inertia and startup load torque applied to the rotary shaft, reduces the vibrations at startup of the motor and hence effectively reduces the vibrational noises and, at the same time, avoids the startup failure of the motor.

The motor assembly and the fluid driving device of the present invention employ the friction clutch and should therefore also have the same technical results, which are not described herein one by one.

BRIEF DESCRIPTION OF THE DRAWINGS

In order to more clearly describe the technical solutions in the prior art or the embodiments of the present invention, the accompanying drawings to be used in the descriptions of the prior art or the embodiments are briefly introduced as follows. Obviously, the following accompanying drawings just illustrate some embodiments of the present invention, and people skilled in the art can obtain other drawings from these drawings without paying creative efforts.

DETAILED DESCRIPTION OF THE PREFERRED EMBODIMENTS

The present invention discloses a friction clutch which reduces the rotational inertia and startup load torque applied to the rotary shaft during startup of the rotary shaft, and reduces the vibrations and avoids startup failure during the motor startup. The present invention further discloses a motor assembly and a fluid driving device using the above friction clutch.

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

Figure 1:
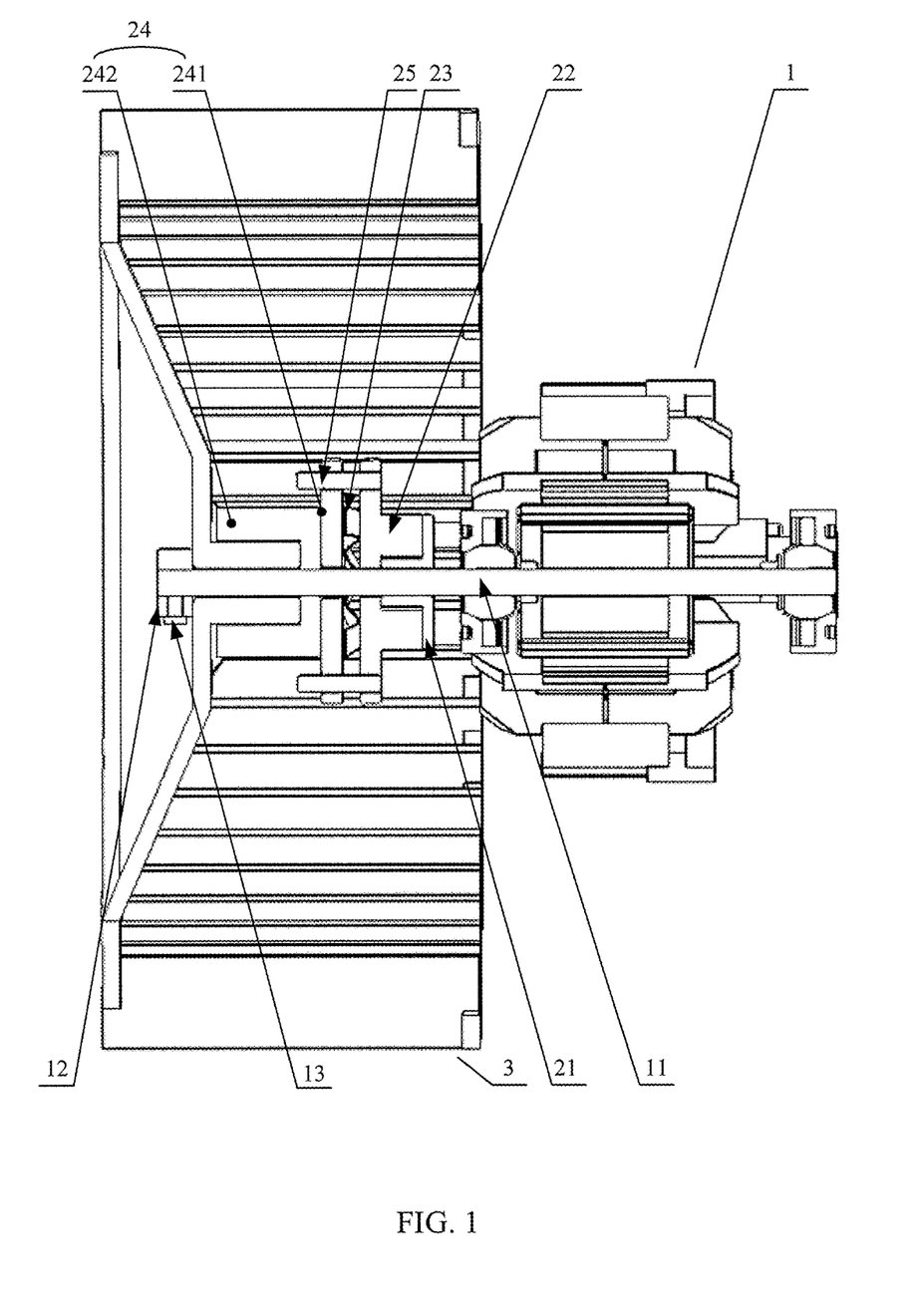
FIG. 1 is a sectional view of a blower according to one embodiment of the present invention.
Figure 2:
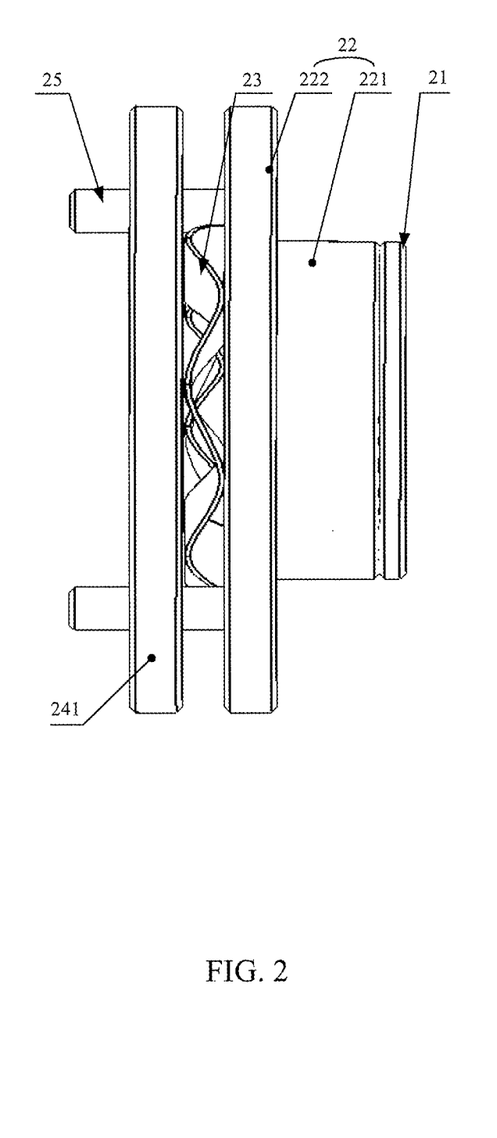
FIG. 2 illustrates a friction clutch of one embodiment of the present invention.
Figure 3:
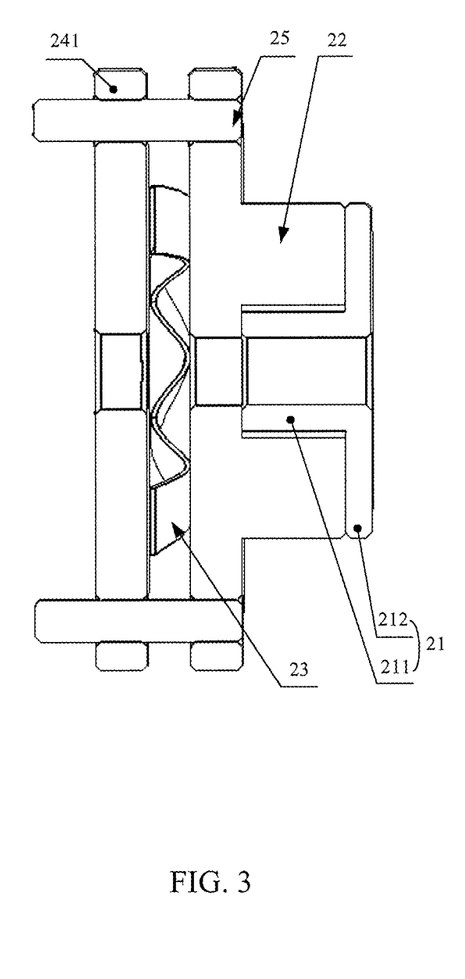
FIG. 3 is a sectional view of the friction clutch of one embodiment of the present invention.

Referring to FIG. 1, FIG. 2 and FIG. 3, a fluid driving device in accordance with one embodiment of the present invention is a blower. FIG. 1 is a sectional view of the blower. FIG. 2 illustrates a friction clutch according to one embodiment of the present invention. FIG. 3 is a sectional view of the friction clutch according to one embodiment of the present invention.

The friction clutch in accordance with the embodiment of the present invention includes a fixing member 21, a connecting member 22, a resilient member 23, and a loading member 24. The fixing member 21 is fixed on a rotary shaft 11, the connecting member 22 is rotatably disposed on the rotary shaft 11, and the connecting member 22 is threadingly engaged with the fixing member 21. In addition, an axis of the threads is coincident with an axis of rotation of the connecting member 22. That is, the fixing member 21 is fixedly disposed on the rotary shaft 11 and the connecting member 22 is rotatably disposed on the rotary shaft 11, with the axis of the engaging threads between the connecting member 22 and the fixing member 21 being coincident with the axis of the rotary shaft 11. The loading member 24 is also rotatably disposed on the rotary shaft 11 and is positioned circumferentially relative to the connecting member 22. The resilient member 23 is disposed between the connecting member 22 and the loading member 24. During mounting of the friction clutch, a load part 3 is axially positioned on the rotary shaft 11, and the fixing member 21 is fixed on the rotary shaft 11, such that an axial spacing between the fixing member 21 and the loading member 24 is fixed. At startup of the motor 1, the fixing member 21 rotates along with the rotary shaft 11.

Taking a compressive resilient member 23 as an example, at startup of the motor 1, the rotary shaft 11 drives the fixing member 21 to rotate in a direction opposite to a threading direction of the engaging threads between the connecting member 22 and the fixing member 21. Because the connecting member 22 and the loading member 24 are slidable attached around the rotary shaft 11 and circumferentially positioned, during an initial period of startup of the motor 1, the connecting member 22 and the rotary shaft 11 slide relative to each other. As a result, the connecting member 22 and the fixing member 21 are unthreaded away from each other, which shortens an axial total length between the connecting member 22 and the loading member 24, such that the resilient member 23 deforms resiliently under a compressing force of the connecting member 22 and the loading member 24 until the resilient member 23 reaches its compression limit under the rotation speed of the rotary shaft 11 and finally the axial positions of the connecting member 22 and the loading member 24 are fixed relative to each other. At this time, the axial positions of the connecting member 22 and the fixing member 21 are also fixed relative to each other, such that the connecting member 22 and the fixing member 21 can no longer rotate relative to each other and, as a result, the connecting member 22 rotates along with the fixing member 21 and the rotary shaft 11. Because the loading member 24 and the connecting member 22 are circumferentially positioned, the loading member 24 rotates along with the rotary shaft 11. When the motor 1 is powered off, due to rotational inertia, a load part 3 drives the loading member 24 to continue rotating, which in turn drives the connecting member 22 to continue rotating relative to the fixing member 21. As a result, the connecting member 22 and the fixing member 21 are threaded toward each other, which shortens the axial distance between the connecting member 22 and the fixing member 21, such that the connecting member 22 and the loading member 24 return to their initial slide states.

Taking a tension resilient member 23 as an example, at startup of the motor 1, the rotary shaft 11 drives the fixing member 21 to rotate in a direction same as the threading direction of the engaging threads between the connecting member 22 and the fixing member 21. Because the connecting member 22 and the loading member 24 are both slidable attached around the rotary shaft 11 and circumferentially positioned, during an initial period of startup of the motor 1, the connecting member 22 and the rotary shaft 11 slide relative to each other. As a result, the connecting member 22 and the fixing member 21 are threaded toward each other, which increases the axial distance between the connecting member 22 and the loading member 24, such that the resilient member 23 deforms resiliently under a tension force of the connecting member 22 and the loading member 24 until the resilient member 23 reaches its extension limit under the rotation speed of the rotary shaft 11. At this time, the axial positions of the connecting member 22 and the loading member 24 are fixed relative to each other, and the axial positions of the connecting member 22 and the fixing member 21 are also fixed relative to each other, such that the connecting member 22 and the fixing member 21 can no longer rotate relative to each other and, as a result, the connecting member 22 rotates along with the fixing member 21 and the rotary shaft 11. Because the loading member 24 and the connecting member 22 are circumferentially positioned, the loading member 24 rotates along with the rotary shaft 11. When the motor 1 is powered off, due to rotational inertia, the loading member 24 drives the connecting member 22 to continue rotating relative to the fixing member 21. As a result, the connecting member 22 and the fixing member 21 are unthreaded away from each other, which increases the axial distance between the connecting member 22 and the fixing member 21, such that the connecting member 22 and the loading member 24 return to their initial slide states.

In the friction clutch of the embodiment of the present invention, at startup of the motor 1, the fixing member 21 rotates along with the rotary shaft 11, the connecting member 22 and the fixing member 21 rotate relative to each other, such that the axial distance/total length between the connecting member 22 and the fixing member 21 progressively changes, and the resilient deforming force applied to the resilient member 23 increases accordingly. That is, the resisting force applied on the connecting member 22 by the resilient member 23 also increases accordingly, and the pressing force applied to threading engaging faces between the connecting member 22 and the fixing member 21 also increases accordingly, such that the rotational friction force between the connecting member 22 and the fixing member 21 also increases until the connecting member 22 and the fixing member 21 are fixed relative to each other and rotate along with the rotary shaft 11. By means of the above configuration, the rotational friction force between the connecting member 22 and the fixing member 21 is very small at startup of the motor 1 (the rotational speed of the rotary shaft 11 is low). Because the loading member 24 is fixedly connected with the load part 3, the load part 3 is stationary at the startup of the motor 1, and the fixing member 21 and the loading member 24 slide relative to each other. As the rotational speed of the rotary shaft 11 of the motor 1 increases, the rotational friction fore between the connecting member 22 and the fixing member 21 also progressively increases, the amount of relative sliding movement between the connecting member 22 and the fixing member 21 decreases until the connecting member 22 and the fixing member 21 become stationary relative to each other, and the rotational speed of the loading member 24 also increases progressively to the synchronous speed of the motor. On the contrary, when the motor stops rotation, due to the rotational inertia, the load drives the connecting member to rotate and progressively decreases its speed, and the threadingly engaged connecting member and the fixing member are threaded/unthreaded relative to each other, such that the axial total length between the connecting member and the fixing member progressively decreases/increases, and the frictional torque between the fixing member and the loading member progressively decreases until the connecting member and the fixing member return to their initial relative sliding states. At startup of the motor 1, the fixing member 22 and the loading member 24 slide relative to each other, which reduces the rotational inertia and startup load torque applied to the rotary shaft 11, reduces the vibrations at startup of the motor 1 and hence effectively reduces the vibrational noises and, at the same time, avoids the startup failure of the motor 1.

The friction clutch of the embodiment of the present invention further includes sliding posts 25 that are disposed in parallel with an axis of rotation of the connecting member 22. One of the connecting member 22 and the loading member 24 is fixedly connected or integrally formed with the sliding posts 24, and the other is in slide engagement with the sliding posts 25, thereby ensuring the smoothness and coaxiality of the connecting member 22 sliding on the rotary shaft 11. In this embodiment, the sliding posts 25 are fixed on the connecting member 22, and the loading member 24 includes through holes for allowing the sliding posts 25 to pass through, which effectively improves the stability of the axial movement of the connecting member 22 and the loading member 24 when the resilient member 23 is forced to deform.

In particular, the number of the sliding posts 25 is as least two which are arranged symmetrically. The number of the sliding posts 25 may also be more than three, which is not described further herein and shall fall with the scope of the present invention.

As shown in FIG. 1 and FIG. 2, preferably, the loading member 24 includes a first positioning plate 241 in contact with the resilient member 23, and a load connecting portion 242 for connecting with the load part 3. The connecting member 22 includes a second positioning plate 222 in contact with the resilient member 23, and a first thread connecting portion 221 for threadingly engaging with the fixing member 21. With the resilient member 23 disposed between the first positioning plate 241 and the second positioning plate 222, uniformity of the force applied to the resilient member 23 can be effectively increased, which facilitates applying the compressing force uniformly on the resilient member 23 especially when the resilient member 23 is the compressive resilient member.

In order to reduce the number of components and facilitate assembly, the first positioning plate 241 and the load connecting portion 242 are integrally formed.

Alternatively, the first positioning plate 241 and the load connecting portion 242 may be separate structures which are fixed relative to each other by gluing or bolt connection.

Similarly, the second positioning plate 222 and the first thread connecting portion 221 are preferably integrally formed. Alternatively, the second positioning plate 222 and the first thread connecting portion 221 may also be separate structures.

In order to increase the stability of the resilient member 23, the resilient member 23 includes a through hole for allowing the rotary shaft to pass through. During assembly, the resilient member 23 is preferably attached around the rotary shaft 11 through the through hole, thus avoiding falling off of the resilient member 23.

In this embodiment, the resilient member 23 is an annular corrugated sheet. An axis of the through hole is coincident with a central axis of the resilient member. By means of the above configuration, the smoothness of the rotation of the resilient member 23 along with the rotary shaft 11.

Preferably, the fixing member 21 includes a positioning stop plate 212 for positioning and contacting an end face of the connecting member 22, and a second thread connecting portion 211 for threadingly engaging with the connecting member 22. When the fixing member 21 and the connecting member 22 rotate relative to each other, positioning between the fixing member 21 and the connecting member 22 is achieved after the positioning stop plate 212 positions and contacts the end face of the connecting plate 22.

In order to reduce the number of components and facilitate assembly, the positioning stop plate 212 and the second thread connecting portion 211 are integrally formed. Alternatively, the positioning stop plate 212 and the second thread connecting portion 211 may also be separately formed.

As shown in FIG. 3, threads on the second thread connecting portion 211 are male threads. The end face of the connecting member 22 facing the fixing member 21 is formed with an inner hole, and female threads for engaging with the male threads of the second thread connecting portion 211 are formed in the inner hole. Configuring the threads on the second thread connecting portion 211 to be the male threads effectively increases the axial length of the fixing member 21 in contact with the rotary shaft 11, thus increasing the fixing stability of the fixing member 21 on the rotary shaft 11.

Figure 4:
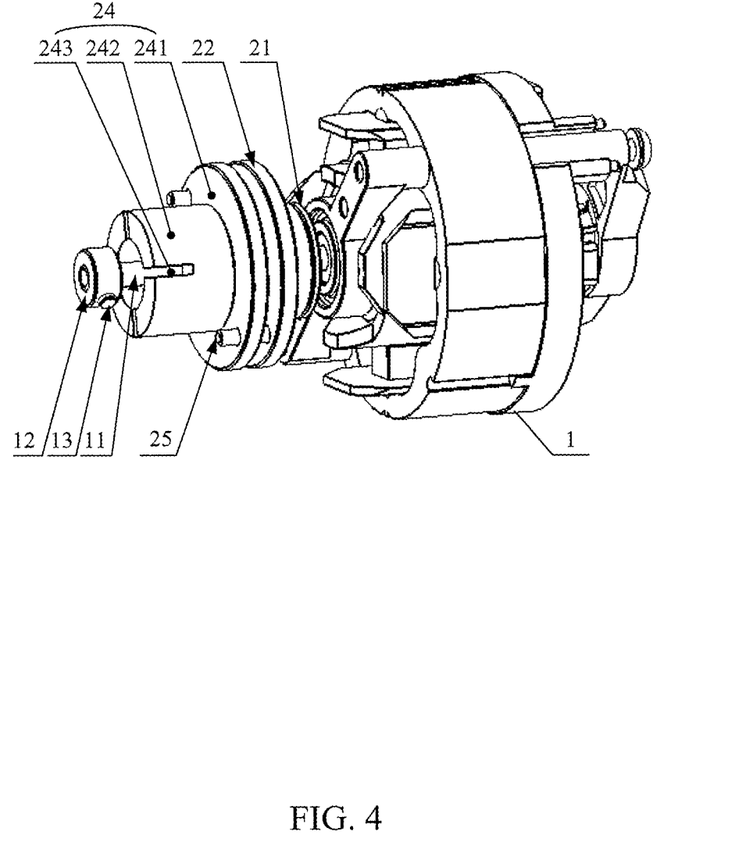
FIG. 4 illustrates a motor assembly according to one embodiment of the present invention.
Figure 5:
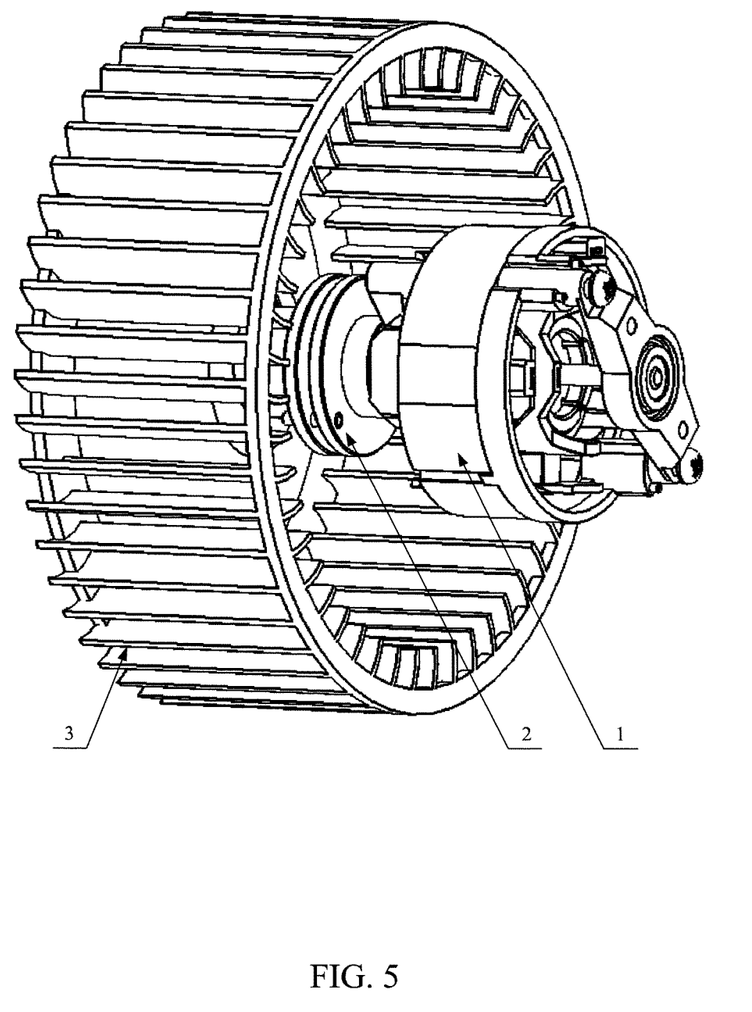
FIG. 5 illustrates the blower according to one embodiment of the present invention.

As shown in FIG. 4, the loading member 24 of this embodiment is formed with a latching groove 243. The load part 3 is latched and fixed to the loading member 24 through the latching groove 243.

One embodiment of the present invention further provides a motor assembly including a motor 1 and a friction clutch 2. The friction clutch 2 is any one of the above-described friction clutches. Since the above-described friction clutches achieve the above-described technical results, the motor assembly employing the above-described friction clutch can also achieve the same technical results, which are not described further herein one by one.

In order to facilitate the axial positioning of the load part 3, the motor assembly in accordance with the embodiment of the present invention further includes a position-limiting member 12 disposed on the rotary shaft 11 of the motor 1 to limit axial movement of the load part 3. The position-limiting member 12 is disposed at one side of the friction clutch 2 opposite from the motor 1.

As shown in FIG. 2, the position-limiting member 12 is fixed on the rotary shaft 11 with a fastening screw 13. In an alternative embodiment, the position-limiting member 12 may also be configured to be a nut, and an end portion of the rotary shaft 11 is provided with threads for engaging with the nut. In still another embodiment, the position-limiting member 12 may be configured to be a clip spring, and the end portion of the rotary shaft 11 is provided with a latching groove for engaging with the clip spring. These embodiments all fall within the scope of the present invention, which are not described further herein one by one.

The resilient member 23 is a compressive resilient member, and the threading direction of the engaging threads of the connecting member 22 and the fixing member 21 is opposite to the rotation direction of the rotary shaft 11.

Alternatively, the resilient member 23 may also be configured to be a tension resilient member, and the threading direction of the engaging threads of the connecting member 22 and the fixing member 21 is the same as the rotation direction of the rotary shaft 11.

One embodiment of the present invention further provides a fluid driving device such as a blower. The blower includes a load part 3 and a motor assembly. The motor assembly is any one of the motor assemblies described above. Since the above-described motor assemblies achieve the above-described technical results, the blower employing the above-described motor assembly can also achieve the same technical results, which are not described further herein one by one. It should be understood that the motor assembly of the present invention is not only suitable for the blower, but it also suitable for a fluid driving device such as an air pump or liquid pump.

In this embodiment, the load part 3 is an impeller.

All embodiments in the specification are described in a progressive way, each embodiment mainly describes the differences from other embodiments, and the same and similar parts among the embodiments can be referenced mutually.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A friction clutch comprising:
   a fixing member fixed on a rotary shaft;
   a connecting member disposed on the rotary shaft, the connecting member being slidable with respect to the rotary shaft, wherein when the rotary shaft starts rotating, an axial distance between the connecting member and the fixing member changes such that a friction force between the fixing member and the connecting member increases until the connecting member rotates synchronously with the fixing member;
   a loading member disposed on the rotary shaft, the loading member being slidable with respect to the rotary shaft, the loading member and the connecting member being circumferentially positioned; and
   a restoring member configured to reduce an amount of change of the axial distance between the fixing member and the connecting member when the rotary shaft stops rotating;
   wherein the friction clutch further comprises a plurality of sliding posts, one of the connecting member and the loading member is fixedly connected with the sliding posts, and the other is slidably engaged with the sliding posts.

2. The friction clutch of claim 1, wherein the fixing member and the connecting member are connected through thread engagement.

3. The friction clutch of claim 1, wherein the restoring member is a resilient member.

4. The friction clutch of claim 3, wherein the loading member includes a first positioning plate in contact with the resilient member, and a load connecting portion for connecting with a load.

5. The friction clutch of claim 4, wherein the first positioning plate and the load connecting portion are integrally formed.

6. The friction clutch of claim 4, wherein the connecting member includes a second positioning plate in contact with the restoring member, and a first thread connecting member for threadingly engaging with the fixing member.

7. The friction clutch of claim 6, wherein the second positioning plate and the first thread connecting portion are integrally formed.

8. The friction clutch of claim 6, wherein the fixing member includes a positioning stop plate for positioning and contacting an end face of the connecting member, and a second thread connecting portion for threadingly engaging with the connecting member.

9. The friction clutch of claim 8, wherein the positioning stop plate and the second thread connecting portion are integrally formed.

10. The friction clutch of claim 9, wherein threads on the second threading connecting portion are male threads.

11. The friction clutch of claim 1, wherein the restoring member includes a through hole for allowing the rotary shaft to pass through.

12. The friction clutch of claim 11, wherein the restoring member is an annular corrugated sheet, a claw-shaped spring sheet, or a ring of resilient material.

13. The friction clutch of claim 1, wherein the sliding posts are symmetrically arranged with respect to an axis of rotation.

14. A motor assembly comprising a motor and the friction clutch according to claim 1.

15. The motor assembly of claim 14, wherein the motor assembly further comprises a position-limiting member disposed on the rotary shaft to limit axial movement of the loading member, the position-limiting member is disposed at one side of the friction clutch opposite from the motor.

16. The motor assembly of claim 14, wherein the restoring member is a compressive resilient member.

17. A fluid driving device comprising a load part and the motor assembly according to claim 14.

* * * * *